Dec. 2, 1969 F. H. HILBERT 3,482,173

WAVE SIGNAL PHASE AND AMPLITUDE DETECTOR

Filed July 5, 1966

INVENTOR
FRANCIS H. HILBERT
BY
Mueller, Aichele & Rauner
ATTYS.

United States Patent Office 3,482,173

Patented Dec. 2, 1969

3,482,173
WAVE SIGNAL PHASE AND AMPLITUDE DETECTOR

Francis H. Hilbert, River Grove, Ill., assignor to Motorola, Inc., Franklin Park, Ill., a corporation of Illinois Filed July 5, 1966, Ser. No. 562,613
Int. Cl. H03d 3/18
U.S. Cl. 329—50 6 Claims

ABSTRACT OF THE DISCLOSURE

A wave signal detector includes a phase splitter responsive to an incoming signal for producing first and second signals 180 degrees out of phase with each other and with the second signal having an amplitude twice that of the first signal. The first signal is coupled directly through a resistance network to a suitable load, and the second signal is coupled to the load through a single diode which has a reference signal applied to it to alternately render it conductive and nonconductive to allow portions of each cycle of the second signal to be conducted to the load. These portions are added to the first signal to produce a resultant signal indicative of the amplitude of the incoming signal and the difference in phase between the first and second signals and the reference signal.

Wave signal detectors as hereinafter described may be sensitive to the phase and the amplitude of an incoming signal. For example, a phase type wave signal detector is utilized in color television receivers where a sub-carrier reference signal at 3.58 megacycles developed by a synchronized local oscillator is applied to the color demodulator in order to derive color difference signals from the chrominance components. It is essential that the 3.58 mc. reference signal be kept at a precise phase relationship with the burst signal in order to provide proper picture reproduction. To that end, the burst signal which is transmitted as part of the composite signal is separated and applied to one of the inputs of a phase detector. A portion of the signal developed by the local oscillator is applied to the other input. The phase detector responds to the phase difference between the two signals and develops a control potential which is fed back to the oscillator to clamp its output signal at the desired phase. More generally, however, a phase detector may be utilized whenever it is desired to obtain a control potential having an amplitude determined by the phase relation between a pair of signals.

Amplitude type wave signal detectors may be used, for example, in the color signal demodulators of a color television receiver. A reference signal at a predetermined phase is applied to the blue signal demodulator which samples the amplitude of the chrominance signal at that phase so that an output signal indicative of the degree of blue saturation is developed. Similarly, by applying a reference signal at a different phase to the red signal demodulator an output signal indicative of the degree of red saturation is developed.

Basically, the operation of a wave signal phase detector consists of gating the incoming signal to a load by means of electronic switches controlled by the reference signal. Detecting systems generally fall into two categories, the first being the type that not only gates portions of the incoming signal to the load but also gates some of the reference signal thereto. Prior art system have accomplished this by employing a phase splitter to develop oppositely phased representations of the incoming signal and two diodes responsive to the reference signal to alternately gate the representations to the load. Because of the construction of this system, at least a portion of the reference signal appears in the load, which for some applications may be undesired.

Accordingly, it is one object of this invention to provide a wave signal detector accomplishing the same function as that described above by utilizing a single diode.

The second type of detector operates to gate only the incoming signals to the load. To effect cancellation of the reference signal, prior art systems have utilized at least four diodes.

It is, therefore, another object of this invention to provide a wave signal detector so constructed as to require only two diodes to cancel the reference signal and allow only the incoming signals to appear in the load.

Figures 1, 2, 3, 4, 5, 6:
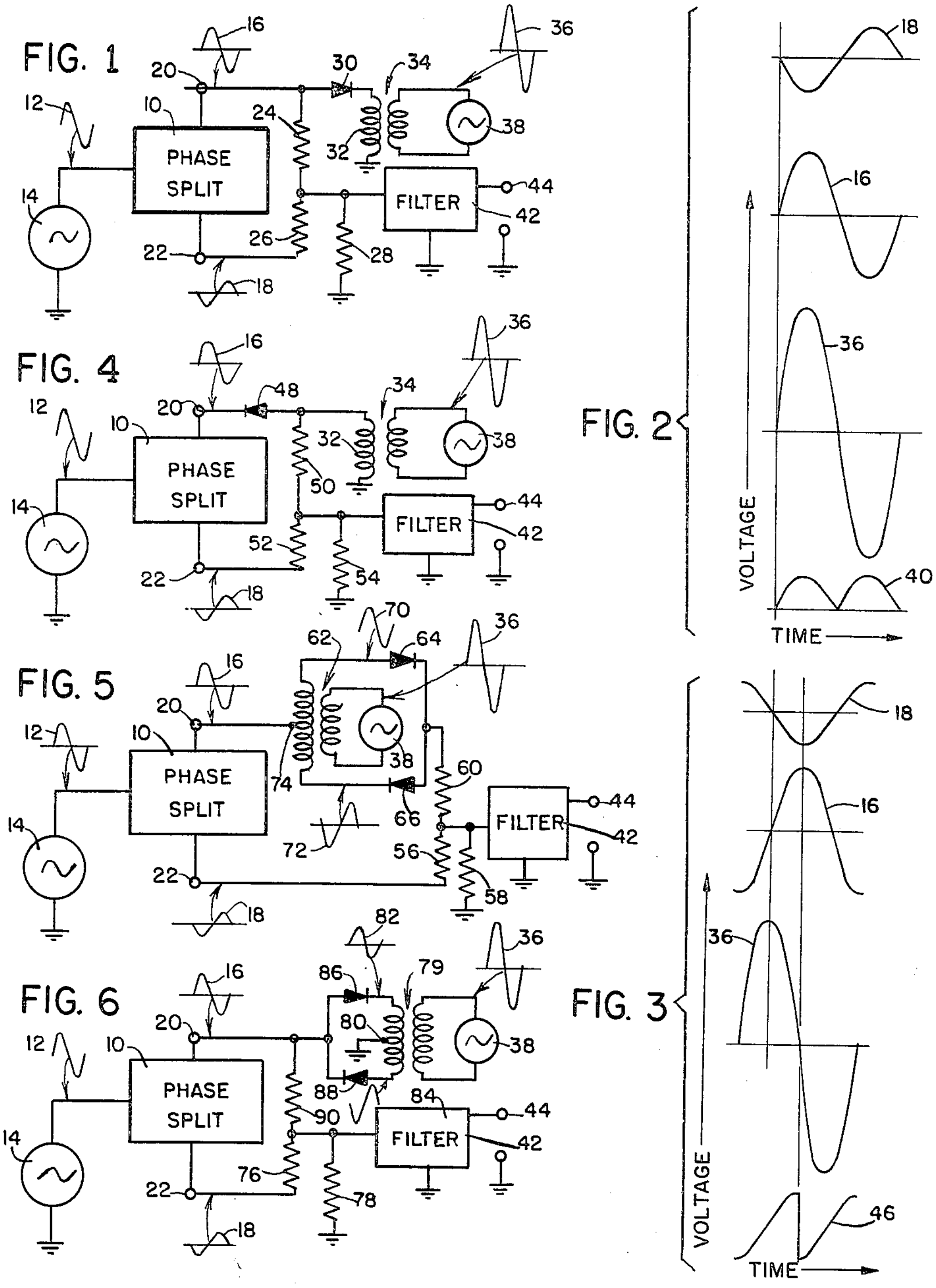
FIG. 1 is a circuit diagram of a shunt type detector employing one diode.
FIG. 2 illustrates a series of waveforms appearing when the reference signal and the incoming signal are in phase.
FIG. 3 illustrates a series of waveforms appearing when the reference signal and the incoming signal are 90° out of phase.
FIG. 4 is a circuit diagram of a series type detector employing one diode.
FIG. 5 is a circuit diagram of a reference signal cancelling, series type detector employing two diodes.
FIG. 6 is a circuit diagram of a reference signal cancelling, shunt type detector employing two diodes.

In brief, the invention includes a phase splitter responsive to an incoming signal to produce first and second signals 180° out of phase with each other. The first signal is coupled through a resistive network to a load so that a continuous representation of the first signal appears thereacross. The second signal, at proper amplitude, is coupled to the load through a nonlinear network comprising at least one diode or other suitable switching device. A reference signal is applied to the nonlinear network to alternately allow portions of each cycle of the second signal to be conducted to the load. These portions combine with the first signal to develop an output signal indicative of both the amplitude of the incoming signal and the difference in phase between the incoming signal and the reference signal.

Referring now to the drawings, the phase detector of FIG. 1 has a shunt mode of operation. Phase splitter 10 is responsive to an incoming signal 12 developed by source 14 to provide a pair of signals 16 and 18 180° out of phase with each other on terminals 20 and 22, respectively. For reasons to be explained subsequently, it is desirable that phase splitter 10 have a characteristic such that the amplitude of signal 16 is approximately twice that of signal 18. A pair of resistors 24 and 26 are connected across phase splitter 10 to provide means through which the respective signals can flow to load resistor 28 which is connected from their junction to ground. Diode 30 is connected between terminal 20 and the secondary winding 32 of transformer 34. Reference signal 36 for alternately switching diode 30 between conductive and non-conductive states is coupled from generator 38 to the cathode of the diode by means of transformer 34.

FIG. 2 illustrates waveforms at various points in the circuit of FIG. 1 when the reference signal 36 is in phase with incoming signal 12. Signal 18 is conducted through resistor 26 so that a continuous representation thereof appears across load resistor 28. The first half cycle of reference signal 36 is positive to cutoff diode 30 so that the first half cycle of signal 16 is forced to flow through resistor 24 and appear across load resistor 28. Secondary winding 32 of transformer 34 is selected to be a low impedance to the frequencies here involved. Thus, when signal 36 is negative during the second half of its cycle, diode 30 is rendered conductive to thereby isolate the second half cycle of signal 16 from load resistor 28 by causing it to be shunted through secondary winding 32 to ground. If signal 16 has an effective amplitude at the load twice that of signal 18, the first half cycle of each combines to provide the first half cycle of signal 40 having a positive polarity and an amplitude equal to that of signal 18. Since the second half cycle of signal 16 does not appear in the load, signal 18 alone provides the second half cycle of signal 40.

It will be noted that during the conduction interval, a portion of the reference signal 36 is rectified by and conducted through diode 30 to appear across load resistor 28. Since the reference signal amplitude is constant, when it is coupled through filter 42, a constant positive DC offset is produced at output terminal 44. Signal 40 is also coupled through filter 42 to remove the AC carrier portion so that a DC component proportional to the amplitude of signal 40 is allowed to pass. This DC component adds to the DC offset to effect a net instantaneous positive control potential at terminal 44.

When the incoming signal 12 shifts 90°, signal 18 will lead reference signal 36 by 90° and signal 16 will lag the reference signal by 90° as shown in FIG. 3. Diode 30 conducts during the first half cycle of signal 36 so that the portion of signal 16 occurring during that interval appears across load resistor 28 to combine with signal 18. The resultant signal 46 when conducted through filter 42, provides a zero DC component which when added to the DC offset, furnishes a control potential equal to the DC offset at output terminal 44. Thus, when the signal that is desired to be detected is in phase with the reference signal, a control potential having a maximum positive value is available while if they are 90° out of phase with each other, the control potential is somewhat less positive. For phase differences between zero and 90° the control potential lies between these extremes.

FIG. 4 illustrates a single diode phase detector of the series type. Signal 18 is conducted through resistor 52 so that the entire cycle appears across load resistor 54. Diode 48 is connected to secondary winding 32 and is poled so that it conducts when signal 36 is positive so as to allow the first half cycle of signal 16 to pass through resistor 50 and appear across load resistor 54. During the negative portion of signal 36, diode 48 is nonconductive so that the second half cycle of signal 16 is isolated from the load. Reference is again made to FIG. 2 where signals 16 and 18 combine to produce signal 40 which is then coupled through filter 42 and added to the DC offset to provide a maximum positive control potential at terminal 44. If signals 12 and 36 are 90° out of phase as shown in FIG. 3, signals 16 and 18 combine to form signal 46 which when passed through filter 42, provides a zero value DC component and upon being added to the DC offset, a less than maximum positive control potential is available at output terminal 44.

FIG. 5 shows a double diode detector operating in a series mode. Signal 18 is conducted through resistor 56 so that the entire cycle appears across load resistor 58. Source 38 is coupled to the primary winding of transformer 62, the secondary of which has a center tap 74 coupled to terminal 20. By phase splitter action, reference signal 36 is transformed into a pair of opposite polarity signals 70 and 72 appearing at opposite ends of the secondary to be applied to diode 64 and 66, respectively. Since the first half cycle of signal 70 is positive to render diode 64 conductive and the first half cycle of signal 72 is negative to render diode 66 conductive, there exists a low impedance between center tap 74 and resistor 60 during the first half cycle of signal 36 to provide a signal path to load resistor 58 for the first half cycle of signal 16. Thus, if reference signal 36 is in phase with incoming signal 12 as in FIG. 2, the first half cycle of signal 16 combines with the first half cycle of signal 18 to produce the first half cycle of signal 40 across load resistor 58. During the second half cycle of signal 36, signals 70 and 72 are of a polarity to cutoff diodes 64 and 66 respectively so that the second half cycle of signal 16 is isolated by a high impedance from the load and signal 18 alone provides the second half cycle of signal 46. Here again, if the effective amplitude of signal 16 at the load is approximately twice that of signal 18 the peak amplitude of the output signal at the load 58 is maintained at a constant positive value equal to the amplitude of signal 18.

A significant difference between the circuits of FIGS. 1 and 4 and the circuit of FIG. 5 is that in the latter an appreciable reference signal does not appear across load resistor 58 because during the first half cycle of signal 36 when both diodes are conducting, the positive half cycle of signal 70 cancels with the negative half cycle of signal 72 at the junction of diodes 64 and 66. Stated differently, the loop current through winding 62 and diodes 64 and 66 is a circulating current that is contained within the loop and hence does not appear in the output load. When signal 40 is conducted through filter 42, the control potential at terminal 44 is simply its average DC component which is at a maximum positive value. When incoming signal 12 shifts 90° as in FIG. 3, signal 46 appears across load resistor 58. When it is conducted through filter 42, a control potential equal to zero is present at terminal 44 because first, the average DC component is zero and second, there is no DC offset due to the reference signal cancellation.

FIG. 6 shows a double diode type phase detector having a shunt mode of operation. signal 18 is conducted through resistor 76 so that the entire cycle appears across load resistor 78. Source 38 is coupled to the primary winding of transformer 79, the secondary of which has a grounded center tap 80. By phase splitter action, reference signal 36 is transformed into a pair of opposite polarity signals 82 and 84 appearing on opposite ends of the secondary to be applied to diodes 86 and 88, respectively. The junction of the anode of diode 86 and the cathode of diode 88 is connected to terminal 20. Since the first half cycle of signal 82 is positive to cutoff diode 86 and the first half cycle of signal 84 is negative to cutoff diode 88, the first half cycle of signal 16 is forced to flow through resistor 90 and appear across load resistor 78. During the second half cycle of signal 36, diodes 86 and 88 are rendered conductive so that there is an effective low impedance path which presents an attenuation of the signal between terminal 20 and center tap 80. Thus, the second half cycle of signal 16 is shunted to ground and does not appear across load resistor 78. The reference signals are cancelled as in the circuit of FIG. 5 so that the control potential at terminal 44 is the average DC component of the signal across load resistor 78. Using the same analysis as previously employed, a maximum positive control potential is available for in-phase signals and a zero value control potential is available for signals 90° out of phase.

It has been explained that the control signal has a maximum positive value for an incoming signal in phase with the reference signal. It may be appreciated that a similar analysis shows that if the incoming signal and the reference signal are 180° out of phase with each other, a maximum negative control signal is developed.

It will be noted that the embodiments described are not only phase sensitive but are also amplitude sensitive. Referring to FIG. 1, for example, and assuming signals 12 and 36 to be in phase, if the amplitude of incoming signal 12 is increased, signals 16 and 18 would increase proportionally so that the signal developed across load resistor 28 would have the same appearance as signal 40 but with a proportional increase in amplitude. If signals 12 and 36 are not in phase, the output signal would have an appearance intermediate waveforms 40 and 46 in FIGS. 2 and 3, respectively, with an increase in amplitude. Thus, it is apparent that if incoming signal 12 is allowed to change in both amplitude and phase, the output signal will reflect both. If a phase detector is required, it may be desirable to remove amplitude effects by simply inserting a limiter so as to maintain signal 12 constant in amplitude. If the wave signal detector is to be used as a color demodulator, then the phase of signal 36 is selected to correspond to the phase of the color to be demodulated so that only the portions of signal 16 at that phase are sampled and applied to the load.

What has been described, therefore, are several embodiments of wave signal detecting circuts including a single diode type which develops a control potential having a DC offset; and a double diode detector for those applications which require that the reference signal not appear in the load.

I claim:

1. A wave signal detector including the combination of; a source of input signals, a phase splitter coupled thereto having first and second circuits, said phase splitter developing first and second oppositely phased components of said input signals across said first and second circuits respectively, the signal components across said second circuit being of greater amplitude than the signal components across said first circuit, load resistance means, a linear network coupling said first circuit to said load resistance means for continuous application of said first components thereto, a nonlinear network coupling said second circuit to said load resistance means for applying said second components thereto, a source of reference signals coupled to said nonlinear network to control the portion of each cycle of said second components which is applied to said load resistance means, said first components and said portion of each cycle of said second components combining to develop a control signal across said load resistance means indicative of the amplitude of said incoming signals and the difference in phase between said input signals and said reference signals.

2. The wave signal detector according to claim 1, said linear and nonlinear networks having translation characteristics such that the amplitude of said second components which are applied to said load resistance is twice that of said first components which are applied to said load resistance means.

3. The wave signal detector according to claim 1 and having a series mode of opeartion; said non-linear network including a unilateral conducting device coupling said second circuit to said load resistance means, means coupling said source of reference signals to said unilateral conducting device, said reference signals alternately switching said unilateral conducting device between conductive and nonconductive states, said portion of each cycle of said second components being translated to said load resistance means during said conductive state and the remainder of each cycle of said second components being isolated from said load resistance means during said nonconductive state, different portions being applied to said load resistance means for different phase relationships between said input signals and said reference signals.

4. The wave signal detector according to claim 1 and having a shunt mode of operation, said nonlinear network including means coupling said second circuit to said load resistance means, and further including a unilateral conducting device coupled to said second circuit, said reference signals coupled to said unilateral conductive state and the remainder of each cycle of said between conductive and nonconductive states, said portion of each cycle of said second components being translated to said load resistance means during said nonconductive state and the remainder of each cycle of said second components being translated through said unilateral conducting device during said conductive state, different portions being applied to said load resistance means for different phase relationships between said input signals and said reference signals.

5. The wave signal detector according to claim 1 and having a series mode of operation, said nonlinear network including a pair of serially connected unilateral conducting devices and means in parallel therewith coupling said second circuit thereto, the junction of said pair of unilateral conducting devices being coupled to said load resistance means, means coupling said source of reference signals to said unilateral conducting devices, said reference signals alternately switching said unilateral conducting devices between conductive a ndnonconductive states, said portion of each cycle of said second components being translated to said load resistance means during said conductive state and the remainder of each cycle of said second components being isolated from said load resistance means during said nonconductive state, different portions being applied to said load resistance means for different phase relationships between said input signals and said reference signals, said pair of unilateral conducting devices performing to cancel said reference signals at said junction so that they do not appear across said load resistance means.

6. The wave signal detector according to claim 1 and having a shunt mode of operation, said nonlinear network including a pair of unilateral conducting devices and means in parallel therewith providing a signal path to ground, said second circuit being coupled to the junction of said pair of unilateral conducting devices, means coupling said source of reference signals to said unilateral conducting devices, said reference signals alternately switching said unilateral conductive devices between conductive and nonconductive states, said portion of each cycle of said second components being translated to said load resistance means during said nonconductive state and the remainder of each cycle of said second components being translated through said unilateral conducting devices and through said signal path to ground during said conductive state, different portions being applied to said load resistance means for different phase relationships between said input signals and said reference signals, said pair of unilateral conducting devices performing to cancel said reference signals at said junction so that they do not appear across said load resistance means.

References Cited

UNITED STATES PATENTS

| | | | |
|---|---|---|---|
| 3,025,418 | 3/1962 | Brahm | 307—295 X |
| 3,238,463 | 3/1966 | Inaba | 329—50 |
| 3,265,976 | 8/1966 | Broadhead | 329—50 X |

ALFRED L. BRODY, Primary Examiner

U.S. Cl. X.R.

178—5.4; 328—133; 307—232, 295; 329—119, 204